United States Patent Office 3,271,409
Patented Sept. 6, 1966

3,271,409
CHEMICAL CONVERSION OF NITRO-PENICILLINS TO 6-AMINOPENICILLANIC ACID
David A. Johnson, Fayetteville, N.Y., assignor to Bristol-Myers Company, New York, N.Y., a corporation of Delaware
No Drawing. Filed Apr. 6, 1964, Ser. No. 357,818
7 Claims. (Cl. 260—306.7)

This invention relates to the conversion by purely chemical means of certain penicillins to 6-aminopenicillanic acid and particularly to the conversion to 6-aminopenicillanic acid of certain ortho-nitropenicillins by reduction of the nitro group.

6-aminopenicillanic acid is desired for use in the production of synthetic penicillins which cannot be made by direct fermentation using appropriate precursors.

The production of 6-aminopenicillanic acid by fermentation of *Penicillium chrysogenum* in the absence of added precursors has been accomplished but is rendered difficult by the problems inherent in the extraction of the 6-aminopenicillanic acid from such fermentation beers and by the absence of a stimulation of yield such as is observed when phenylacetic acid is added as a precursor to produce benzylpenicillin. The hydrolysis or "splitting" to 6-aminopenicillanic acid of penicillins such as benzylpenicillin and phenoxymethylpenicillin has been accomplished enzymatically but that process requires the use of techniques and facilities for handling the microorganisms from which such enzymes must be obtained.

The purely chemical synthesis of 6-aminopenicillanic acid involves numerous steps in the reaction scheme and is not considered to be commercially feasible. The only reported chemical degradations of a penicillin to 6-aminopenicillanic acid are those in which the penicillin itself was synthesized chemically from 6-aminopenicillanic acid, i.e. from benzyloxypenicillin or from tritylaminopenicillanic acid as in British Patent No. 894,368 and U.S. Patent No. 3,028,379.

It is the object of the present invention to provide a purely chemical method for the degradation to 6-aminopenicillanic acid of a penicillin which can be produced in high yield by the fermentation of *Penicillium chrysogenum* or equivalent microorganisms in the presence of a suitable precursor.

The object of the present invention has been achieved by the provision, according to the present invention, of the process of reducing to a hydroxylamino or an amino group a nitro group on the benzene or naphthalene ring of a penicillin having a nitrophenyl or a nitronaphthyl group attached at the position ortho to the nitro group by a direct bond or through an oxygen or sulfur atom to methylpenicillin and subsequently maintaining the reduced penicillin in solution in liquid medium to produce 6-aminopenicillanic acid, and if desired, recovering said 6-aminopenicillanic acid from said liquid medium.

A preferred embodiment of the present invention is the process for the production of 6-aminopenicillanic acid which comprises reducing to a hydroxyamino or an amino group, preferably by catalytic hydrogenation, the ortho-nitro group of a nitropenicillin selected from the group consisting of acids of the formulae

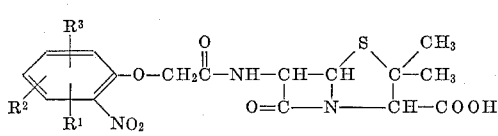

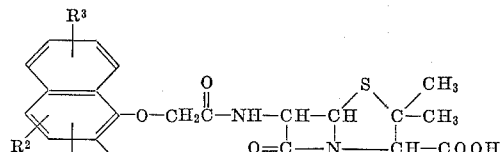

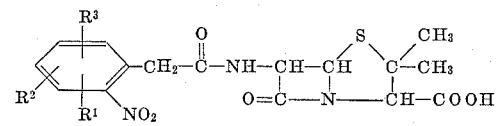

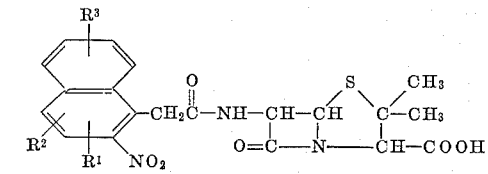

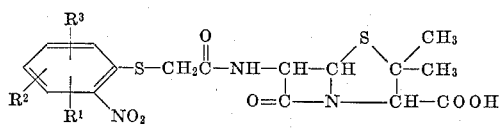

and

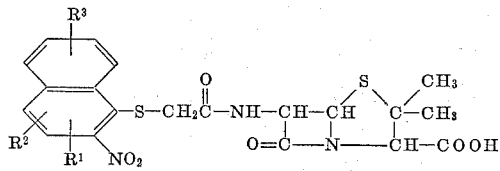

wherein $R^1$, $R^2$ and $R^3$ are each a member selected from the group consisting of hydrogen, (lower)alkyl, lower alkoxy, chloro, bromo, iodo, trifluoromethyl, cyano, nitro, di(lower)alkylamino, methylsulfonyl, (lower)alkanoyl, (lower)alkylthio, phenoxy, benzyloxy, allyloxy and carbalkoxy and salts thereof and subsequently maintaining the reaction product of said reduction in solution in liquid medium, preferably at a pH in the range of 1 to 6, for at least a brief period of time.

Preferred species of the present invention are the processes for the production of 6-aminopenicillanic acid which comprise reducing to a hydroxylamino or an amino group, preferably by catalytic hydrogenation, the nitro group of a "nitropenicillin" of the formulae

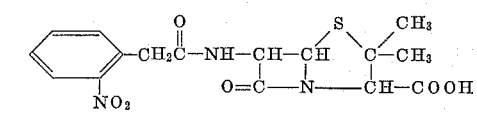

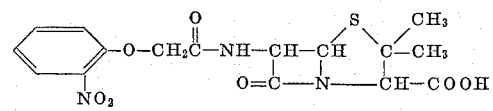

and

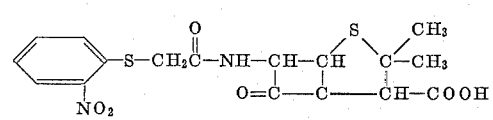

and subsequently maintaining the reaction product of said reduction in solution in liquid medium, preferably at a pH in the range of 1 to 6, for at least a brief period of time.

The conversion of an itropenicillin to 6-aminopenicillanic acid according to the present invention can be illustrated as follows:

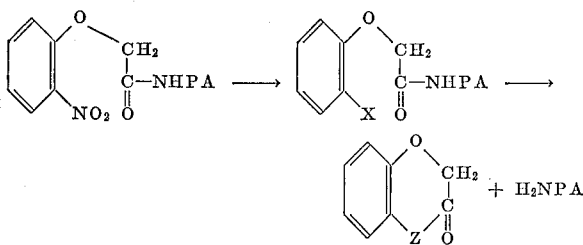

wherein X represents —NH₂ or —NHOH, Z represents

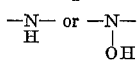

and PA represents 6-substituted penicillanic acid of the formula

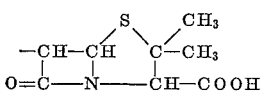

Formation of the stable benzoxazine ring system is presumed to be a driving force for the reaction. Analogous bicyclic compounds are formed from o-nitrophenylthiomethylpenicillin (o-nitro-penicillin S) and o-nitrobenzylpenicillin (o-nitro-penicillin G).

The reduction of the nitro group can be carried out by any of the methods known to reduce such an aromatic nitro group to a hydroxylamino or an amino group without destruction of the penicillin nucleus as determined by simple test. Preferred methods include hydrogenation in the presence of either a noble metal catalyst or Raney nickel and reduction by the use of borohydrides in the presence of palladium.

Suitable borohydrides include sodium borohydride and potassium borohydride. Sodium borohydride (NaBH₄) is a white to gray-white microcrystalline powder containing four moles of available hydrogen per mole. It is stable in dry air, decomposes very slowly in moist air and reacts inappreciably with water at room temperature but rapidly at 50° C. or in the presence of acids or certain metal cations such as Co⁺⁺ and Ni⁺⁺. Preferred solvents for use with sodium borohydride are water (55), alcohols [e.g. methanol, ethanol (4RS), isopropyl alcohol (0.25 RS)], amines [e.g. isopropylamine (10), morpholine (1), pyridine (3)], dioxane, tetrahydrofuran (SS), and dimethyl-Cellosolve (0.8). The figures in parentheses are the approximate solubilities in grams per 100 g. solvent at 20° C.; RS means reacts slowly; SS means slightly soluble. Sodium borohydride is generally insoluble in ethers, hydrocarbons and alkyl chlorides.

There is particularly included within the scope of the present invention the use of penicillins herein called "orthonitropenicillins" which are orthonitronaphthylmethylpenicillins, orthonitronapthyloxymethylpenicillins, orthonitronapthylthiomethylpenicillins and particularly the preferred orthonitrobenzylpenicillins, orthonitrophenoxymethylpenicillins and orthonitrophenylthiomethylpenicillins each of which is either unsubstituted elsewhere on the benzene or naphthyl rings or is also substituted on the benzene or naphthyl rings with one or two or three substituents selected from the group consisting of (lower)alkyl, (lower)alkoxy, chloro, bromo, iodo, trifluoromethyl, cyano, nitro, di(lower)alkylamino, methylsulfonyl, (lower)alkanoyl, (lower)alkylthio, phenoxy, benzyloxy, allyloxy and carbalkoxy such as carbethoxy.

The "orthonitropenicillins" used as starting materials in the process of the present invention are prepared according to known processes, e.g. as set forth in U.S. Patents 2,479,295, 2,479,296, 2,562,410 and 2,623,876.

The preferred liquid medium in which the hydroxylamino or aminopenicillin is maintained to permit it to split spontaneously to the benzoxazine or analogous compound and 6-aminopenicillanic acid is dilute aqueous acid, preferably in the range of pH 1 to 6. The temperature may be up to 50° C. or lower, e.g. that of an ice bath. The time is not important and may be quite short; indeed, some of these hydroxylamino and aminopenicillins appear to split to 6-aminopenicillanic acid practically as fast as they are formed during the reduction, especially if it is carried out at an acidic pH or the equivalent thereof.

The "nitropenicillins" used as starting material may be in the form of the free acid or of one of the many known salts. It is often most convenient to use the sodium or potassium salt.

The following examples are given to illustrate the present invention but it is not to be considered as limited thereto.

EXAMPLE 1

*Preparation of 6-aminopenicillanic acid from potassium 6-(o-nitrophenoxyacetamido)-penicillanate (potassium o-nitropenicillin V)*

Potassium 6 - (o-nitrophenoxyacetamido)penicillanate potassium o-nitropenicillin V), 3.0 g. (6.9 mmole), was dissolved in 70 ml. of water (the pH was 6.2) and this solution was treated with 3.0 g. of prehydrogenated 30% Pd-on-diatomaceous earth and 30 ml. of water under 51 p.s.i.g. of hydrogen at room temperature for one hour. Methyl isobutyl ketone, 100 ml., was added. The mixture was placed in an ice bath and the pH was adjusted from 9.0 to 2.0 with 20% aqueous hydrochloric acid. The mixture was filtered through a funnel precoated with a filter-aid (Sil-Flo). The aqueous layer contained a new compound [o-aminopenicillin V, 6-(o-aminophenoxyacetamido)penicillanic acid] according to thin layer chromatography. The aqueous phase was adjusted to pH 3.0 and was distilled under reduced pressure to reduce it to about one-quarter of its original volume.

After 16 hours' storage in a refrigerator, 0.53 g. of a pink crystalline solid separated from the concentrated aqueous solution. A thin layer chromatogram (using 95% acetone, 5% acetic acid as the solvent system) of this solid showed two major zones, Rf 0.76 and 0.57 and one minor zone Rf 0.12 (the Rf of 6-aminopenicillanic acid was 0.47).

The filtrate from the above pink crystalline solid was mixed with 3.1 g. of di(2-ethylhexyl)sodium sulfosuccinate (Aerosol OT) dissolved in 30 ml. of methyl isobutyl ketone at pH 2.0 and 5–10° C. for a few minutes. The organic layer was separated, dried over anhydrous sodium sulfate (cold), filtered and the filtrate was adjusted to pH 5.2 with triethylamine. After stirring in the cold a short time, crude 6-aminopenicillanic acid separated as an amorphous solid and was collected; wt. 0.10 g. A second fraction of this solid product was obtained by the addition of lower alkanes (Skellysolve B) to the filtrate; wt. 0.15 g.

These products showed identical thin layer chromatograms with two major zones, Rf 0.57 and 0.47 (the latter being the position for authentic 6-aminopenicillanic acid). The first fraction had a chemical potency versus 6-aminopenicillanic acid of 210 mcg./mg. Its infrared spectrum showed a band for the β-lactam carbonyl group. The second fraction had a chemical potency versus 6-aminopenicillanic acid of 253 mcg./mg.

EXAMPLE 2

*Preparation of 6-aminopenicillanic acid from potassium 6 - (o-nitrophenoxyacetamido)penicillanate (potassium o-nitropenicillin V)*

Potassium 6 - (o-nitrophenoxyacetamido)penicillanate (potassium o-nitropenicillin V, 10.0 g., 0.023 mole), was dissolved in 100 ml. of water and treated with 10.0 g. of prehydrogenated 30% Pd-on-diatomaceous earth and 90 ml. of water under 54.5 p.s.i.g. of hydrogen for one hour at room temperature. The pressure dropped 5.5 p.s.i.g. during this period. Methyl isobutyl ketone, (200 ml.) was added, the mixture was placed in an ice bath, and the pH was adjusted from 9.0 to 2.0 with 50% hydrochloric acid. The mixture was filtered through a (Sil-Flo) precoated funnel and the aqueous layer (which showed a zone for o-amino-penicillin V on a silica gel plate) was treated with a solution of 10.2 g. (0.023 mole) of di(2-ethylhexyl)sodium sulfosuccinate (Aerosol OT) in 100 ml. of methyl isobutyl ketone at pH 2.0 in an ice bath for a few minutes. The organic layer was cooled, dried over an hydrous sodium sulfate and filtered. The filtrate was adjusted to pH 5.2 with triethylamine and the resulting turbid solution was stored at 36° C. for 3.0 hours. 6-aminopenicillanic acid separated as an amorphous tan solid which was collected on a filter funnel, washed with methyl isobutyl ketone and lower alkanes (Skellysolve B) and dried in a 45° C. vacuum oven; wt. 1.97 g. A thin layer chromatogram of this solid 6-aminopenicillanic acid showed a major zone in the same position where 6-aminopenicillanic acid was found and a faster minor zone which was most probably o-amino-penicillin V. Its chemical potency versus 6-aminopenicillanic acid was 440 mcg./mg.

*Preparation of phenethicillin*

The above 440 mcg./mg. 6-aminopenicillanic acid (1.95 g.; 9 millimole) was slurried in 260 ml. of water and 104 ml. of methyl isobutyl ketone at pH 3.0 and 10–20° C. while 2.1 ml. (2.4 g.; 13.0 millimole) of α-phenoxypropionyl chloride was added in one portion. The pH was maintained at 3.0 by addition of 10% aqueous sodium hydroxide solution. The mixture was stirred cold for 25 minutes and then the ice bath was removed and it was stirred for an additional 15 minutes. The pH was adjusted to 7.0 and the mixture was filtered through a (Sil-Flo) precoated funnel. The aqueous layer was extracted at pH 2.0 with 100 ml. of methyl isobutyl ketone. The organic layer was passed through a (Sil-Flo) precoated funnel and then treated with 10 ml. of saturated aqueous potassium acetate solution. The resulting mixture was stirred at 30° C. for 2½ hours. Potassium phenethicillin [potassium 6-(α-phenoxypropionamido)penicillanate] separated as a white crystalline solid, was collected on a filter funnel, washed with methyl isobutyl ketone, butanol and acetone, and dried in a 40° C. vacuum oven; wt. 0.37 g. It was homogeneous according to thin layer chromatography and the zone had the same Rf value as authenic phenethicillin. Its infrared spectrum was identical with that of phenethicillin. A second fraction of crystalline solid was obtained by addition of 10 ml. of saturated aqueous potassium acetate solution to the filtrate of the first fraction. This was stirred for four hours at 30° C. The solid which separated weighed 0.035 g. and was identical with the first fraction according to its thin layer chromatogram.

The above fractions of phenethicillin were combined and dissolved in 7 ml. of butanol and 1 ml. of water. The solution was treated with a trace of charcoal (Darco KB) and filtered. The filtrate was distilled under reduced pressure until white needles of phenethicillin began to separate. These were collected, washed with butanol, and dried; their weight was 0.14 g., their chemical potency was 660 mcg./mg. and their biological potency was 860 mcg./mg. A second fraction of white needles (0.10 g.) was obtained by further distillation of the filtrate. This proved to be analytically pure phenethicillin; versus phenethicillin the chemical potency was 840 mcg./mg. and the biological potency was 860 mcg./mg.

*Analysis.*—Calc'd for $C_{17}H_{19}O_5N_2SK$: C, 50.8; H, 4.76; N, 6.97. Found: C, 50.82; H, 4.74; N, 7.04.

EXAMPLE 3

*Preparation of 6-aminopenicillanic acid from potassium 6-(o - nitrophenoxyacetamido)penicillanate (potassium o-nitropenicillin V) and isolation of 3,4-dihydro-2H-1,4-benzoxazin-3-one fragment*

Potassium 6-(o - nitrophenoxyacetamido)penicillanate (potassium o-nitropenicillin V; 10.0 g., 0.023 mole), was dissolved in only 50 ml. of water and hydrogenated as in Example 2 except that the time was cut to 20 minutes. Amorphous 6-aminopenicillanic acid (1.94 g.) was isolated and had a chemical potency versus 6-aminopenicillanic acid of 320 mcg./mg. The filtrate (of the Aerosol OT solution from which the 6-aminopenicillanic acid had been removed after precipitation) was extracted with 30 ml. of 5% aqueous sodium hydroxide solution. The aqueous layer was acidified to red litmus with 50% hydrochloric acid. A white solid separated which was taken up in ether. The ether solution was dried over sodium sulfate and distilled at atmospheric pressure until a yellow solid remained; wt. 0.4 g. This was recrystallized once from hot water and once from hot water using charcoal (Darco KB). White needles, 0.08 g., were obtained which melted at 171.0–174.8° C. and exhibited a thin layer chromatogram and an infrared absorption spectrum identical with those of authentic 3,4-dihydro-2H-1,4-benzoxazin-3-one prepared by zinc and acid reduction of o-nitrophenoxyacetic acid.

EXAMPLE 4

*Preparation of 6-aminopenicillanic acid from potassium 6-(o-nitrophenylacetamido)penicillanate (potassium o-nitropenicillin G)*

Potassium 6 - (o - nitrophenylacetamido)penicillanate (potassium o-nitropenicillin G) was hydrogenated in the manner used previously on potassium 6-(o-nitrophenoxyacetamido)penicillanate (potassium o-nitropenicillin V) in Example 1 except that the period of hydrogenation was limited to 30 minutes. The pH 2.0 aqueous solution contained o-aminobenzylpenicillin according to thin layer chromatography, exhibiting an Rf of 0.68 in the 95% acetone-5% acetic acid solvent system. The Rf of 6-aminopenicillanic acid in that system is about 0.47. In another solvent system the aqueous solution had a smaller Rf value than the starting material. The pH 2.0 aqueous solution was treated with an equimolar amount of Aerosol OT dissolved in methyl isobutyl ketone followed with triethylamine as was the hydrogenation product from potassium 6-(o-nitrophenoxyacetamido)penicillanate (potassium o-nitropenicillin V) in Example 2. The resulting organic solution was stored in a refrigerator for four days during which time a dark gum separated. The gum was washed with methyl isobutyl ketone and acetone and dried to a dark amorphous solid. The latter contained 6-aminopenicillanic acid as shown by its thin layer chromatogram together with the starting material (o-aminopenicillin G).

EXAMPLE 5

*Preparation of 6-aminopenicillanic acid from potassium 6-(o - nitrophenylthioacetamido)penicillanate (o - nitropenicillin S)*

Potassium 6-(o-nitrophenylthioacetamido)penicillanate (o-nitropenicillin S) was hydrogenated in the manner of Example 2 except that the mixture was approximately twice as concentrated and the reaction period was only 40 minutes long. The pH 2.0 aqueous solution contained o-aminopenicillin S [6-(o-aminophenylthioacetamido)penicillanic acid] according to its think layer chromatogram (Rf 0.75 in 95% acetone-5% acetic acid solvent system). The fact that it was soluble in pH 2.0 water indicated that the starting material was reduced. The solution was divided into two equal portions.

The first portion was adjusted to pH 4.0 and stored one day in a refrigerator and then one day at 25° C. After this time, a thin layer chromatogram of the solution showed a zone in the 6-aminopenicillanic acid position (Rf 0.53) as well as the original zone (Rf 0.74).

The second portion of the pH 2.0 aqueous solution was treated with Aerosol OT dissolved in methyl isobutyl ketone followed by neutralization with triethylamine as in Example 2. A zone in the 6-aminopenicillanic acid position was observed on the thin layer chromatogram of the solution after aging it one day in a refrigerator and one day at 25° C.

While various embodiments of the present invention have been described in some detail it will be understood that modifications can be made in the procedures described without departing from the scope of this invention. Certain reagents, compounds, catalysts, reducing agents, solvents and other details described or equivalent to those described in relation to any procedure exemplified herein may be employed in the practice of the present invention as will be apparent to those skilled in this art in view of the present disclosure.

EXAMPLE 6

*Preparation of 6-aminopenicillanic acid from potassium 6-(o-nitrophenoxyacetamido)penicillanate (potassium o-nitropenicillin V), KBH₄ and 5% Pd-carbon*

To 0.75 g. (14 millimole) of KBH₄, dissolved in 70 ml. of water, was added 0.05 g. of 5% Pd-C. Nitrogen gas was bubbled through the resulting suspension and the latter was stirred and cooled to 5° C. The pH was adjusted to between 8.0 and 8.6 by addition of 6 N HCl and was maintained at this point while a solution of 3.0 g. (6.9 millimole) of potassium 6-(o-nitrophenoxyacetamido) penicillanate (potassium o-nitropenicillin V) in 30 ml. of water was rapidly added (during 1–3 minutes). There was much gas evolution and the temperature rose spontaneously to 12° C. The mixture was then stirred cold for 15 minutes. Methyl isobutyl ketone (MIBK), 100 ml. was added and the pH was lowered to 2.0 by addition of 6 N HCl. The catalyst was removed by filtration through a hardened filter paper and the aqueous layer was extracted two more times with a total of 150 ml. of MIBK. The wet MIBK solutions were combined and allowed to stand at room temperature for approximately two hours. A crystalline solid began to separate. The slurry was cooled in an ice bath and filtered. The crystalline cake was washed thoroughly with MIBK and lower alkanes (Skellysolve B; in later experiments, MIBK and acetone were used) and dried in a 40° C. vacuum oven: wt. 0.43 g.; M.P. 195.9–198.5° C. d. (corr.); chemical potency (versus 6-aminopenicillanic acid) 980 mcg./mg. The thin layer chromatogram and the infrared spectrum of this light tan solid were identical with those of authentic 6-aminopenicillanic acid. The yield was 29%.

What is claimed is:

1. The process for the production of 6-aminopenicillanic acid which comprises reducing to a group selected from the group consisting of hydroxylamino and amino the ortho-nitro group of a "nitropenicillin" selected from the group consisting of acids of the formulae

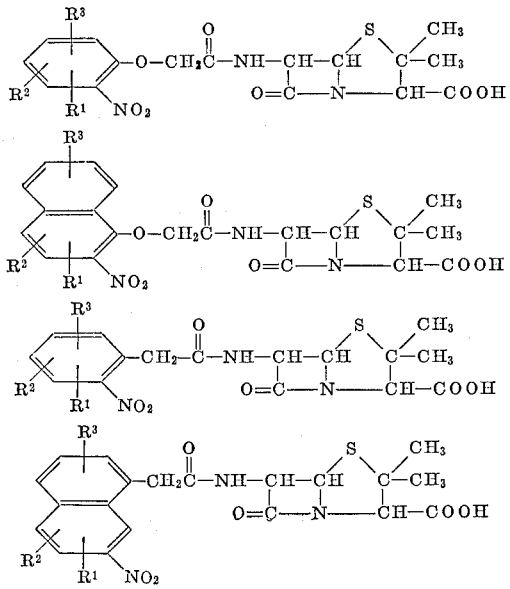

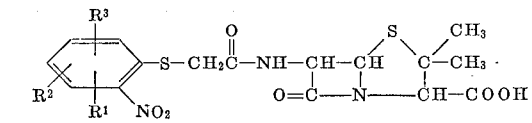

and

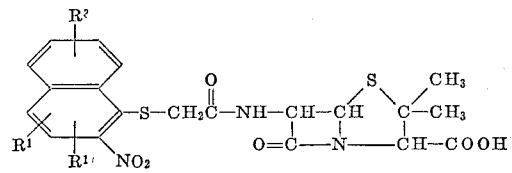

wherein $R^1$, $R^2$ and $R^3$ are each a member selected from the group consisting of hydrogen, (lower)alkyl, (lower)alkoxy, chloro, bromo, iodo, trifluoromethyl, cyano, nitro, di(lower)alkylamino, methylsulfonyl, (lower)alkanoyl, (lower)alkylthio, phenoxy, benzyloxy, allyloxy and carbalkoxy and salts thereof and subsequently maintaining the reaction product of such reduction in solution in an inert solvent for said reaction product for at least several minutes at a pH in the range of 1 to 6.

2. The process of claim 1 for the production of 6-aminopenicillanic acid which comprises mixing with an alkali metal borohydride a compound selected from the group consisting of acids of the formulae

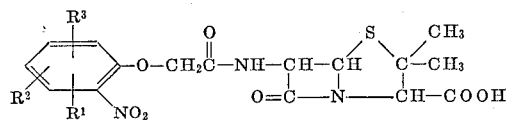

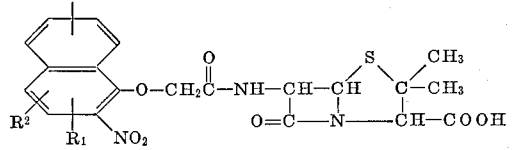

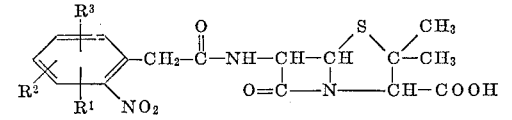

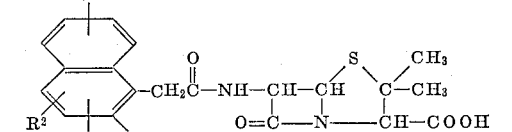

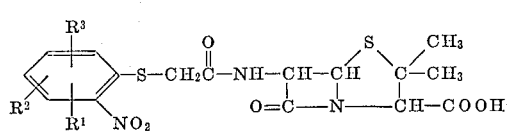

and

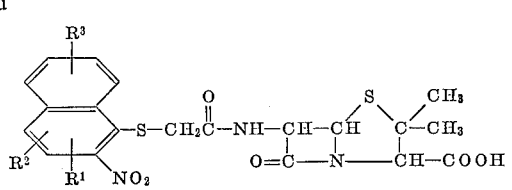

wherein $R^1$, $R^2$ and $R^3$ are each a member selected from the group consisting of hydrogen, (lower)alkyl, (lower)alkoxy, chloro, bromo, iodo, trifluoromethyl, cyano, nitro, di(lower)alkylamino, methylsulfonyl, (lower)alkanoyl, (lower)alkylthio, phenoxy, benzyloxy, allyloxy and carbalkoxy and salts thereof and subsequently maintaining the reaction product in solution in an inert solvent for said reaction product for at least several minutes at a pH in the range of 1 to 6.

3. The process of claim 1 for the production of 6-aminopenicillanic acid which comprises catalytically hydrogenating a compound selected from the group consisting of acids of the formulae

[Structure 1: benzene ring with R1, R2, R3, NO2 substituents, -O-CH2-C(=O)-NH-CH-CH (with S/C(CH3)2/N-CH-COOH β-lactam ring)]

[Structure 2: naphthalene ring with R1, R2, R3, NO2 substituents, -O-CH2-C(=O)-NH-CH-CH (β-lactam ring)]

[Structure 3: benzene ring with R1, R2, R3, NO2 substituents, -CH2-C(=O)-NH-CH-CH (β-lactam ring)]

[Structure 4: naphthalene ring with R1, R3, NO2 substituents, -CH2-C(=O)-NH-CH-CH (β-lactam ring)]

[Structure 5: benzene ring with R1, R2, R3, NO2 substituents, -S-CH2-C(=O)-NH-CH-CH (β-lactam ring)]

and

[Structure 6: naphthalene ring with R1, R2, R3, NO2 substituents, -S-CH2-C(=O)-NH-CH-CH (β-lactam ring)]

wherein R¹, R² and R³ are each a member selected from the group consisting of hydrogen, (lower)alkyl, (lower)alkoxy, chloro, bromo, iodo, trifluoromethyl, cyano, nitro, di(lower)alkylamino, methylsulfonyl, (lower)alkanoyl, (lower)alkylthio, phenoxy, benzyloxy, allyloxy and carbalkoxy and salts thereof and subsequently maintaining the reaction product of said reduction in solution in an inert solvent for said reaction product at a pH in the range of 1 to 6 for at least several minutes.

4. The process of claim 3 for the production of 6-aminopenicillanic acid which comprises catalytically hydrogenating the compound of the formula

[Structure: phenyl-NO2 with -CH2-C(=O)-NH-CH-CH (β-lactam ring with S, C(CH3)2, N-CH-COOH)]

and subsequently maintaining the reaction product of said reduction of a salt thereof in solution in an inert solvent for said reaction product at a pH in the range of 1 to 6 for at least several minutes at a temperature in the range of about 0° C. to about 50° C.

5. The process of claim 3 for the production of 6-aminopenicillanic acid which comprises catalytically hydrogenating the compound of the formula

[Structure: phenyl-NO2 with -O-CH2-C(=O)-NH-CH-CH (β-lactam ring)]

and subsequently maintaining the reaction product of said reduction or a salt thereof in solution in an inert solvent for said reaction product at a pH in the range of 1 to 6 for at least several minutes at a temperature in the range of about 0° C. to about 50° C.

6. The process of claim 3 for the production of 6-aminopenicillanic acid which comprises catalytically hydrogenating the compound of the formula

[Structure: phenyl-NO2 with -S-CH2-C(=O)-NH-CH-CH (β-lactam ring)]

and subsequently maintaining the reaction product of said reduction or a salt thereof in solution in an inert solvent for said reaction product at a pH in the range of 1 to 6 for at least several minutes at a temperature in the range of about 0° C. to 50° C.

7. The process of claim 2 for the production of 6-aminopenicillanic acid which comprises (a) mixing the acid of the formula

[Structure: phenyl-NO2 with -O-CH2-C(=O)-NH-CH-CH (β-lactam ring)]

or a salt thereof with an alkali metal borohydride and subsequently (b) maintaining the reaction product in solution in liquid medium at a temperature in the range of about 0° C. to about 50° C. and at a pH in the range of 1 to 6 for at least several minutes.

References Cited by the Examiner
UNITED STATES PATENTS 3,188,311    6/1965    Morin et al. _____ 260—243

References Cited by the Applicant
UNITED STATES PATENTS 2,479,295    8/1949    Behrens et al.
2,479,296    8/1949    Behrens et al.
2,562,410    7/1951    Behrens et al.
2,623,876    12/1952   Behrens et al.
3,028,379    4/1962    Sheehan.

FOREIGN PATENTS 882,277    11/1961    Great Britain.
894,368    4/1962     Great Britain.

ALEX MAZEL, *Primary Examiner.*

HENRY R. JILES, JAMES W. ADAMS, Jr.,
*Assistant Examiners.*